March 29, 1949.    J. M. MARKS    2,465,736
SAFETY POCKET AND BAG FABRICATION
Filed Aug. 9, 1946    4 Sheets-Sheet 1
FIG_1_
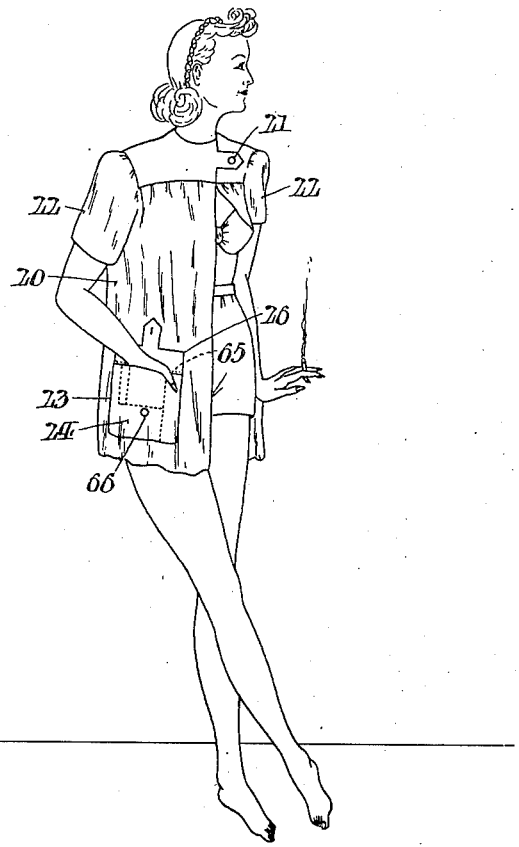
FIG_2_
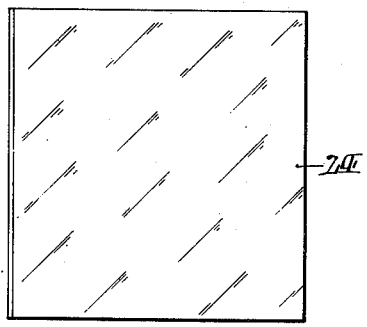
FIG_3_
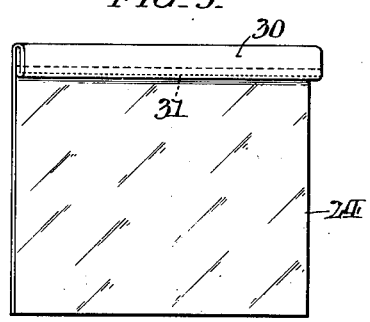
WITNESSES
Alfred T. Bratton
George L. Comly
INVENTOR:
Jeannette M. Marks,
BY Paul & Paul
ATTORNEYS.

March 29, 1949.　　　　J. M. MARKS　　　　2,465,736
SAFETY POCKET AND BAG FABRICATION
Filed Aug. 9, 1946　　　　　　　　　　　4 Sheets-Sheet 2
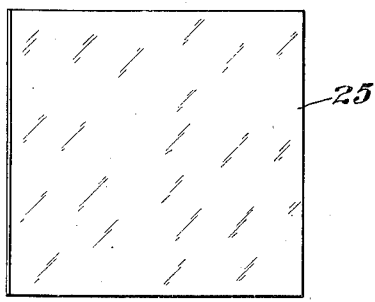
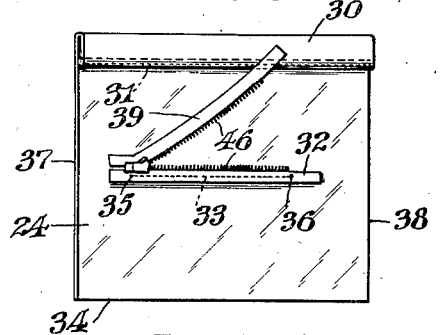
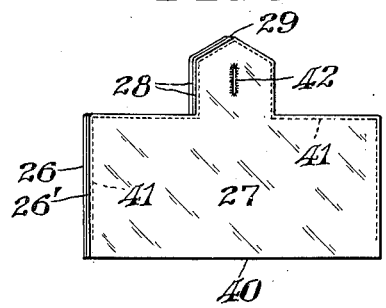
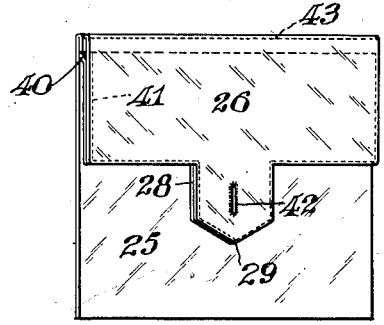
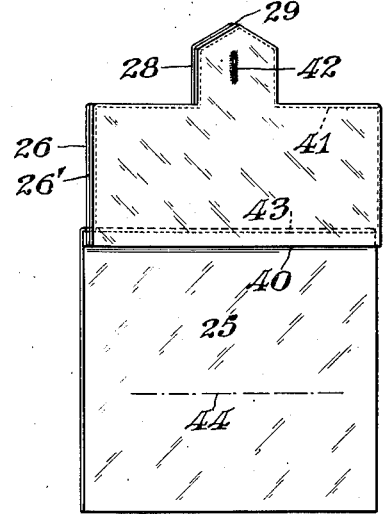
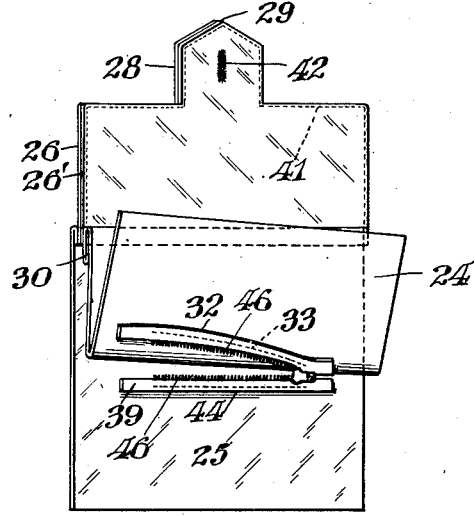
WITNESSES
INVENTOR:
Jeannette M. Marks,
BY Paul & Paul
ATTORNEYS.

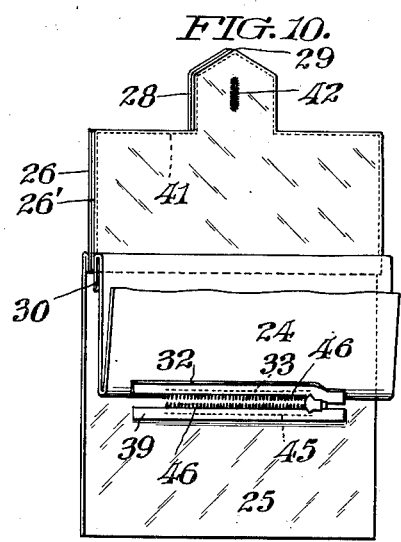
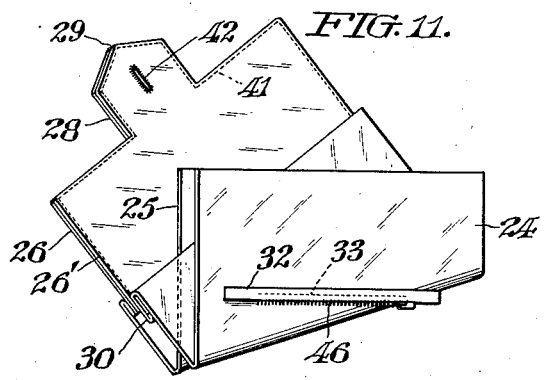
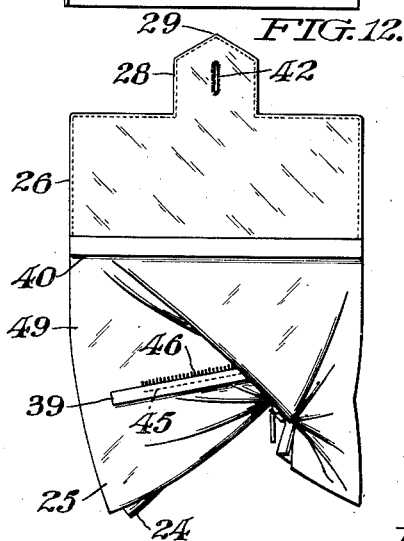
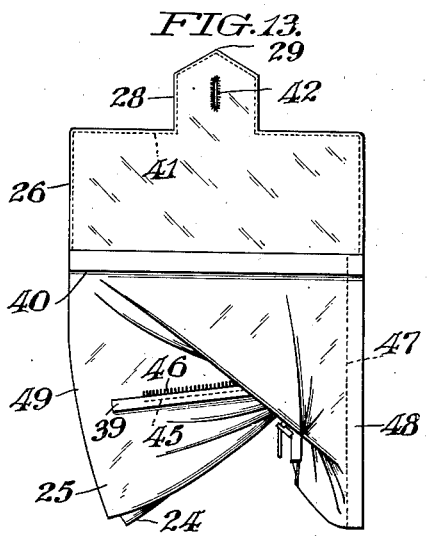
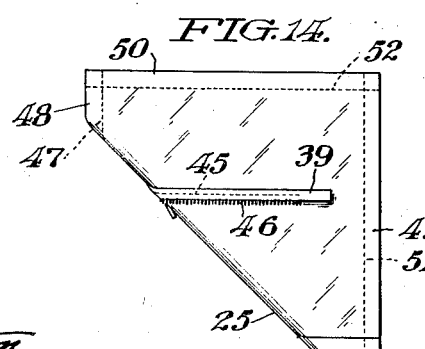

March 29, 1949.   J. M. MARKS   2,465,736
SAFETY POCKET AND BAG FABRICATION
Filed Aug. 9, 1946   4 Sheets-Sheet 4
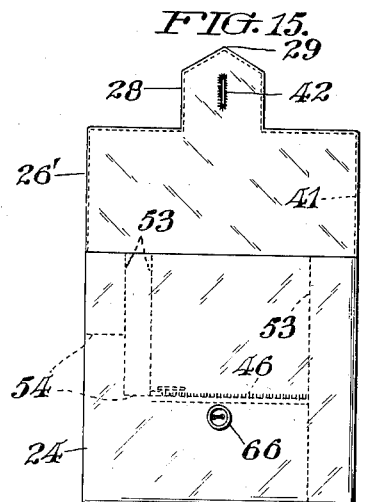
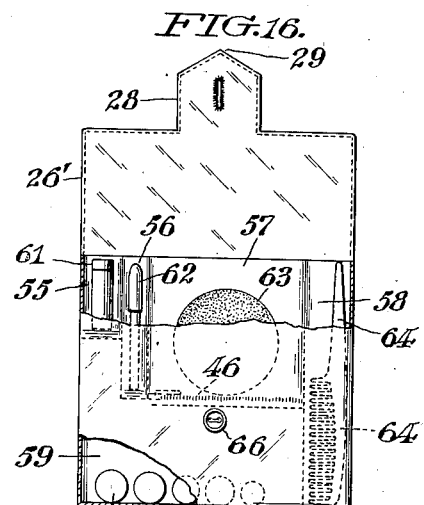
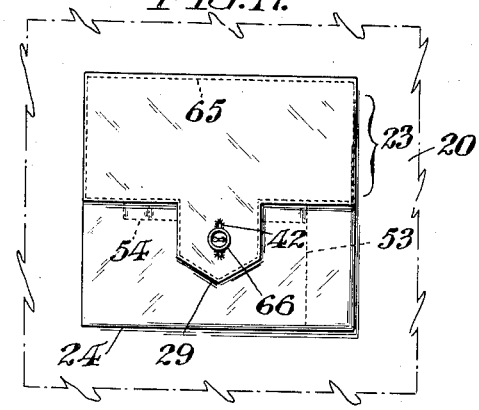
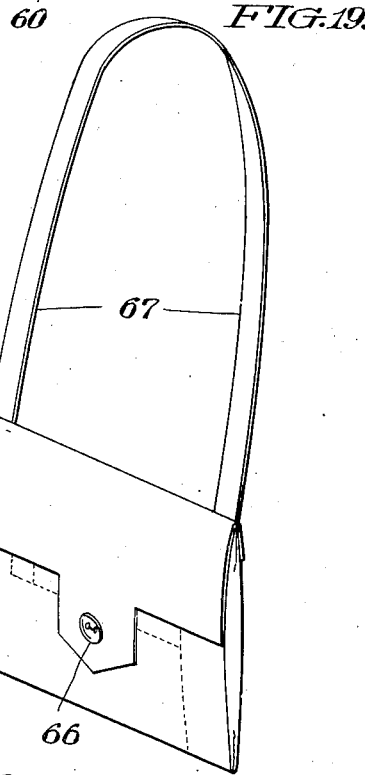
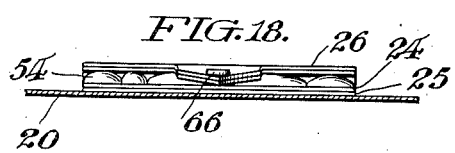
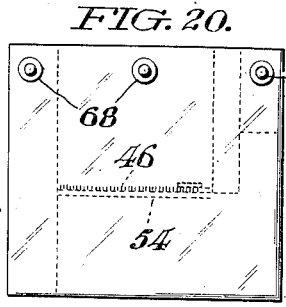
WITNESSES
INVENTOR:
Jeannette M. Marks,
BY
ATTORNEYS.

Patented Mar. 29, 1949

2,465,736

UNITED STATES PATENT OFFICE 2,465,736

SAFETY POCKET AND BAG FABRICATION

Jeannette M. Marks, Bridgeport, Conn.

Application August 9, 1946, Serial No. 689,598

2 Claims. (Cl. 2—253)

This invention has reference, in its broader aspect, to pockets for garments, pouch-bags and analogous articles of attire; while it relates more particularly to the fabrication of pockets and similar receptacles particularly adapted for women's and girls' use, or for carriage by them. Heretofore many such pockets and pouch bags have been made to include compartment sections as well as being provided, in some instances, with a zipper-closed section for the safe inclusion of loose change and bills. Many such pockets have been adapted to men's clothing, but are not applicable to women's apparel or use as carrier means for their conventional accessories and make-up equipment.

Accordingly, the primary aim of my invention is to provide a new and useful pocket or strap-bag and manner of making the same, in which the aforementioned feminine accessories, and so forth, may be conveniently assembled and carried without being jumbled together, as well as having additional provision for the safe repository of valuables and/or currency.

Another aim of this invention is to provide a serviceable patch-pocket for use by women and girls which can be easily secured to garments, inserted in and attached to a pocket, or applied to the lining of coats, bathrobes, fur coats, raincoats and beach-wear; or easily arranged as a shoulder-strap pouch bag or ladies' reticule.

A further aim of this invention is the provision of a pocket device of the above indicated species which is easily connectable to shopping bags, and thereby provide for the accommodation of more bundles and the like in such bags.

A still further aim of my invention is to provide a readily attachable and/or detachable pocket device which may be made of washable material, with individual compartments for cosmetics, as well as a relatively separate inner section for the temporary reception of money and valuables.

With the above stated aims and other objects in view, this invention consists in the novel manner of fabricating, as well as the features of formation of, the pocket or bag, substantially as hereinafter fully disclosed, illustrated by the accompanying four sheets of drawings, and more specifically pointed out in the concluding claims.

In the drawings:

Fig. 1, Sheet 1, is a fanciful portraiture of a young lady wearing a beach-coat including the novel pocket of my invention.

Fig. 2 is a plan view of an initial plain or patterned blank of suitable material, conveniently cut to rectangular contour, to provide an outer or frontal element of the novel pocket and as viewed from the rear side thereof.

Fig. 3 is a plan view of the preceding figure after the upper edge has been initially folded, then inwardly retroverted, and seamed to provide a desirable depth of hem.

Fig. 4, Sheet 2, is a similar view to Fig. 2 showing how the other or rear element of the pocket is initially formed.

Fig. 5 is a view similar to Fig. 3 showing how the pocket frontal element has the one tape component of a zipper fastening-device transversely attached thereto intermediate its top and bottom edges, with the ends thereof spaced relative to the side edges of said frontal element, for a purpose later on herein explained.

Fig. 6 is a plan view of complemental flap elements.

Fig. 7 is a plan view illustrating how the relatively inner or rear pocket element and the flap elements are folded and seamed together, as hereinafter explained.

Fig. 8 is a plan view somewhat similar to the preceding figure but having the attached flap elements extended, with a dot-and-dash line marking across the lower rear element for a purpose later set forth.

Fig. 9 is a similar view to Fig. 8 but illustrating in addition thereto how the pocket frontal element of Fig. 5 is positioned thereon with the lower part partially turned up to show alignment of the other or relatively lower unattached tape edge, of the coactive zipper component, aligned with the dot-and-dash mark referred to in Fig. 8, ready for sewing to the inner or rear pocket element.

Fig. 10, Sheet 3, is a view substantially corresponding to Fig. 9 but showing the lower gripper component tape of the zipper attached to the rear pocket element with the zipper-hooks out of action or substantially disengaged.

Fig. 11 is a plan view illustrative of how the pocket frontal and rear elements are initially folded preparatory for movement into relatively reverse registration for seaming together.

Fig. 12 is a plan view further illustrative of how the relatively inside-out pocket frontal and rear elements are further moved into position through the disengaged zipper components preparatory to seaming together of the right-hand side of said frontal and rear elements.

Fig. 13 is a similar view to the preceding but showing the right-hand seam having been made.

Fig. 14 is a further development of the procedure, after the right-hand seam of Fig. 13 is made, the same involving inversion of the incomplete pocket and its passage through the interval between the right-hand seam and spacially proximate ends of the zipper tape components with the latter approximately horizontal, while the frontal and rear pocket elements are planarly folded and spread for seaming along the left-hand side and bottom edges thereof, as hereinafter fully explained.

Fig. 15, Sheet 4, is a plan view showing how the pocket or bag of this invention is seamed vertically and horizontally to define compartmental sections for the reception of individual toilet articles.

Fig. 16 is a similar view to the preceding with parts broken out to better indicate typical articles or things contained in the respective compartmental sections.

Fig. 17 is a fragmentary elevation showing the improved patch-pocket attached to a garment such as the beach-coat shown in Fig. 1.

Fig. 18 is an underside plan view of Fig. 17.

Fig. 19 is a perspective view illustrating the adaptation of this invention as a shoulder-strap or "Wac" pouch bag; and, Fig. 20 is a smaller scale plan view of the pocket or pouch as adapted for a readily removable and washable liner for ordinary pockets and the like.

In describing the forms of this invention exemplified in the accompanying drawings, specific terms will be employed for the sake of clarity, but it is to be understood the scope of said invention is not thereby limited; each such term being intended to embrace all reasonable equivalents which perform the same function for an analogous purpose.

Referring more in detail to the drawings and first to Fig. 1 the reference character 20 comprehensively distinguishes a beach-coat, said coat being patterned along fashionable lines to include a single-button yoke 21, short sleeves 22, and a patch-pocket generally designated 23, all fabricated in accordance with this invention.

The patch-pocket 23, as shown to best advantage by Figs. 2–18 inclusive, comprises a frontal element 24, preferably although not essentially, cut from the same species of cloth or other material from which the coat 20 is made, said element being approximately square, or for instance nine and one-quarter inches wide by nine and one-half inches long.

I next cut from the same species of material a second blank approximately nine and one-quarter inches wide by eight and three-quarter inches long to form the relatively inner or rear element 25 of the pocket 23, see Fig. 4; whereupon I proceed to cut a pair of complemental flaps 26, 26', see Fig. 6, each said flap embodying a rectangular section 27 of approximately nine and one-quarter inches by four and one-half inches, with a medially located tongue 28 projecting from one major dimension side of each said section 27. This tongue 28 is conveniently two and one-half inches wide by a like dimension vertically with the relatively free end suitably angled at 29, as readily understood from Fig. 6.

Having cut out the necessary components of the improved pocket or bag 23, I conveniently proceed as follows: Taking first, for example, the frontal element 24 I lay the same face downwards and fold over one-quarter of an inch, and then make a further infold of about one-inch to provide a hem 30, see Fig. 3, and then seam said hem along the inner edge, as conventionally indicated at 31, to the element 24. I next attach to the back of the frontal element 24, as shown in Fig. 5, the one or relatively lower as shown tape component 32 of a zipper fastening-device, as by stitching 33; note being had that said component 32 is secured to the element 24 along a horizontal line approximately three and three-quarter inches above the lower edge 34, with the left and right-hand edges respectively terminating at points 35, 36 one and three-quarter and two and one-quarter inches from the associated side edges 37, 38; while the other or upper tape component 39 of the zipper is left free.

I next take the two complemental flaps 26, place them face to face with the tongue portions 28 in register, turn over or inwards the respective perimetrical edges, for about one-quarter inch, except along the lower edges 40 thereof, and then seam said flaps 26 and tongues 28 together as indicated by the dotted lines 41 in Fig. 6; turn the joined entity inside out and thereafter make a buttonhole 42 through the tongue 28; all as readily understood by those conversant with the art. I now take the connected flaps 26, 26', lay the same on and in registration with the upper edge of the pocket rear element 25 and join the flap 26 only to said element by transverse sewing 43 along a line approximately one-quarter inch inwardly and from side edge to side edge, as readily appreciated on an examination of Figs. 7 and 8; whereupon I lay the parts 25, 26 out lengthwise as shown in the latter figure and proceed to mark off a line 44 corresponding to, and adapted for registration with, the previously explained zipper tape component 32. Having marked out the line 44, the pocket frontal element 24 is laid on the rear element 25, with the lower half of said element turned-up, as shown in Fig. 9, in order that the lower edge of the zipper tape component 39 may be placed in registration with the line 44 on the element 24 and connected to the latter by stitching 45, as aforesaid. From an inspection of Fig. 10 it will be seen and readily understood that the frontal element 24 is now loosely connected to the parts 25, 26 by the zipper tape components 32, 39, whereupon I proceed to draw said parts intermediate the unattached or disengaged zipper-hooks 46 into the consecutive positions of Figs. 11 and 12 preparatory to attaching together the right-hand sides of the elements 24, 25 along a seam line 47, about one-quarter inch inwardly with respect to the side edges thereof; it being understood that both elements 24, 25 have their patterned faces in confronting relation. Having completed the right-hand seam 47, Fig. 13, I invert the now partially completed pocket 23 and reverse the procedure just above described with resultant infolding or collapsing of the right-hand seamed free edges 48 of said pocket, and attached flap 26, concertina fashion to the position of Fig. 14, in order that the left-hand unattached or free edges 49 and bottom free edges 50 thereof may be seamed together, along the rectangularly-related lines 51, 52 respectively; whereupon the pocket 23 is turned inside-out so that the patterned faces of the elements 24, 25 are exposed in normal position or as viewed in Fig. 15.

Referring now to Figs. 15 and 16 I next lay the pocket 23 flat with the flap 26 extended, as shown, as well as having the zipper-hooks 46 interengaged and proceed to stitch the front and back elements 24, 25 together along vertical and horizontal lines 53, 54 respectively, thereby to define differential lengths of compartmental-sections 55, 56, 57 and 58, Fig. 16; it being particularly noted that the interengaged zipper-hooks 46 constitute the bottom of the section 57 while at the same time closing-in and providing a protected section 59 for loose change 60, and/or other valuables, as readily understood by those conversant with the art. By way of illustration only, the compartmental section 55 serves as a holder for lipstick 61; that designated 56 for an eyebrow-pencil 62; that marked 57 affords housing for a powder-puff 63; and that marked 58 for a hair-comb 64. The completed patch-pocket 23 is now ready for attachment, as such, to the garment or coat 20, see Figs. 1 and 17, 18, by a horizontal line of stitching 65 along the fold-over of the flap 26, while the tongue 28 of the latter is connectable to a centrally located button 66, stitched to the frontal element 24 of said pocket.

Fig. 19 shows how the improved patch-pocket 23 is readily adapted for use as a pouch or "Wac" bag by the simple expedient of attaching thereto a shoulder-strap 67 in an obvious manner; while Fig. 20 typically illustrates how said pocket 23 may be made of washable material and fitted with one of the components of conventional snap-fasteners 68, so that the bag 23 may be inserted into an ordinary garment pocket and snapped into place, thus allowing for the ready removal thereof.

From the foregoing it is thought the merits and advantages of my improved patch-pocket or pouch-bag will be fully appreciated in that it is obviously comfortable and of serviceable character, while it is furthermore readily made of washable material for detachment when desirable; whereas the seaming together of the frontal and rear components may be effected by reversely rolling said components. The bag is designed, for instance, as a convenient carrier for cosmetics in individual and readily accessible compartments, arranged to each side of the vertical center line of the pocket, and with an inner upper compartment setting apart a relatively lower safety-section which is efficiently protected against illicit access.

Having thus described my invention, I claim:

1. As a new article of manufacture a patch-pocket or pouch for feminine use comprising frontal and rear elements of suitable material and of approximately square outline, seams uniting said elements along the bottom and opposed side edges; a flap seamed to the upper edge of the rear element, said flap including back to back pieces of the same material and embodying a rectangular section with a medially-located tongue extending from the relatively upper edge thereof; vertical and horizontal lines of stitching separating the patch pocket or pouch bag into different compartmental-sections and transversely subdividing the wider of said compartments into an upper and a lower part; a zipper device which, when interengaged, closes in and provides a normally inaccessible lower safety-section segregated from the compartmental-sections aforesaid; means whereby the tongue of the flap aforesaid is releasably-attached to the frontal element of the pocket or pouch; and means whereby the pocket or pouch is supportable for convenient access.

2. The method of making a patch-pocket or pouch of the type described which involves the following steps; cutting plural blanks or approximately square contour from suitable material, overlapping the upper edge of one blank to form a hem, and attaching spacedly therebelow one tape component of a zipper fastening device; cutting complemental rectangular flaps of like material with medially located tongue portions projecting from one side of each said flap; superimposing said flap-blanks face to face, perimetrically seaming the same together except along the lower edges, turning the joined entity inside out, and forming a button-hole through the flap tongue portions; aligning the flap entity with the un-hemmed upper edge of the other first mentioned plural blanks and uniting said entity and upper edge by seaming; superimposing said first mentioned blanks with the attached flap entity in back to back relation, and sewing the other tape component of the zipper fastening device thereto along a line in registration with that of the first mentioned tape component; drawing the plural blanks intermediate the disengaged zipper component into face confronting position and seaming the right-hand edges of said blanks together; inverting the now partially completed pocket and reversing the drawing procedure, just previously stated, with resultant collapsing of the right-hand seamed edges concertina-fashion, and seaming the left-hand and bottom free edges together along rectangularly related lines; turning the pocket or pouch inside out to expose the faces of the attached plural blanks; interengaging the zipper component and smoothing out the attached parts; and seaming the plural blanks together along vertical and horizontal lines, with resultant formation of compartmental-sections of differential capacity and a safety section closed-in by the zipper fastening device.

JEANNETTE M. MARKS.

REFERENCES CITED

The following references are of record in the file of this patent:

UNITED STATES PATENTS

| Number | Name | Date |
|---|---|---|
| Re. 16,916 | Traxler | Mar. 27, 1928 |
| 129,950 | Garaud | June 17, 1873 |
| 745,927 | Sweeney | Dec. 1, 1903 |
| 879,638 | Hayes | Feb. 18, 1908 |
| 2,251,576 | Puodis | Aug. 5, 1941 |

FOREIGN PATENTS

| Number | Country | Date |
|---|---|---|
| 10,231 | Great Britain | Apr. 25, 1914 |